(12) United States Patent
Wellbrock et al.

(10) Patent No.: US 9,692,544 B2
(45) Date of Patent: Jun. 27, 2017

(54) METHOD AND APPARATUS FOR A RECONFIGURABLE OPTICAL ADD/DROP MODULE WITH LOOP-BACK FUNCTIONS

(75) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 198 days.

(21) Appl. No.: 13/482,594

(22) Filed: May 29, 2012

(65) Prior Publication Data

US 2013/0322868 A1 Dec. 5, 2013

(51) Int. Cl.
*H04B 10/08* (2006.01)
*H04J 14/00* (2006.01)
*H04J 14/02* (2006.01)
*H04B 10/035* (2013.01)
*H04B 10/075* (2013.01)

(52) U.S. Cl.
CPC ...... *H04J 14/0204* (2013.01); *H04J 14/0205* (2013.01); *H04J 14/0206* (2013.01); *H04J 14/0209* (2013.01); *H04J 14/0212* (2013.01); *H04J 14/0217* (2013.01); *H04J 14/0227* (2013.01); *H04B 10/035* (2013.01); *H04B 10/075* (2013.01); *H04J 14/0295* (2013.01)

(58) Field of Classification Search
None
See application file for complete search history.

(56) References Cited

U.S. PATENT DOCUMENTS

| | | | | |
|---|---|---|---|---|
| 2007/0115456 A1* | 5/2007 | Wisseman | ............. | H04B 10/00 356/73.1 |
| 2008/0013950 A1* | 1/2008 | Boudreault | ......... | H04J 14/0212 398/59 |
| 2009/0290873 A1* | 11/2009 | Takita | .................... | H04J 3/1611 398/59 |
| 2011/0085803 A1* | 4/2011 | Ji | ........................ | H04J 14/0204 398/79 |
| 2011/0095767 A1* | 4/2011 | Motter | ................ | H04L 12/2697 324/539 |
| 2011/0200324 A1* | 8/2011 | Boertjes | .............. | H04J 14/0212 398/16 |
| 2013/0259474 A1* | 10/2013 | Ji | ........................ | H04J 14/0212 398/48 |
| 2013/0315579 A1* | 11/2013 | Xia | .................... | H04Q 11/0001 398/5 |

\* cited by examiner

*Primary Examiner* — Ken N Vanderpuye
*Assistant Examiner* — Jai Lee (57) ABSTRACT

A method and apparatus for approaches for troubleshooting optical networks, particularly ROADM-based networks is described. The method includes designating a first port, of an optical communication node of a transport network, as an ingress for a loop-back optical signal to troubleshoot the transport network, designating a second port, of the optical communication node, as an egress for the loop-back optical signal, and establishing a loop-back connection between the first port and the second port to transport the loop-back optical signal.

20 Claims, 11 Drawing Sheets

METHOD AND APPARATUS FOR A RECONFIGURABLE OPTICAL ADD/DROP MODULE WITH LOOP-BACK FUNCTIONS

BACKGROUND INFORMATION

Optical networks provide an effective transport mechanism for various communication systems. These optical networks typically have implemented use of reconfigurable optical add/drop modules (ROADM) to carry traffic onto and off the networks; such traffic can originate and terminal at routing networks. Because the size of commercial transport optical networks (i.e., having a large number of nodes), troubleshooting and isolating network performance issues have increased in complexity and are time consuming.

Therefore, there is a need for improved approaches for troubleshooting optical networks, particularly ROADM-based networks.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred method and system for troubleshooting optical networks with loop-back functionality is described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a reconfigurable optical add/drop modules (ROADM), it is contemplated that other equivalent network equipment or communication nodes may be used. A ROADM may have various implementations but is generally colorless, directionless, and contentionless. As used herein, colorless refers to a functionality allowing a channel to be assigned any color a network is configured to accept, directionless refers to a functionality allowing any add channel to be received from any direction (e.g., North, East, West, South), and any drop channel to be sent in any direction, and contentionless refers to a functionality allowing any channel to be configured without causing limitations on neighboring channels.

Figure 1A:
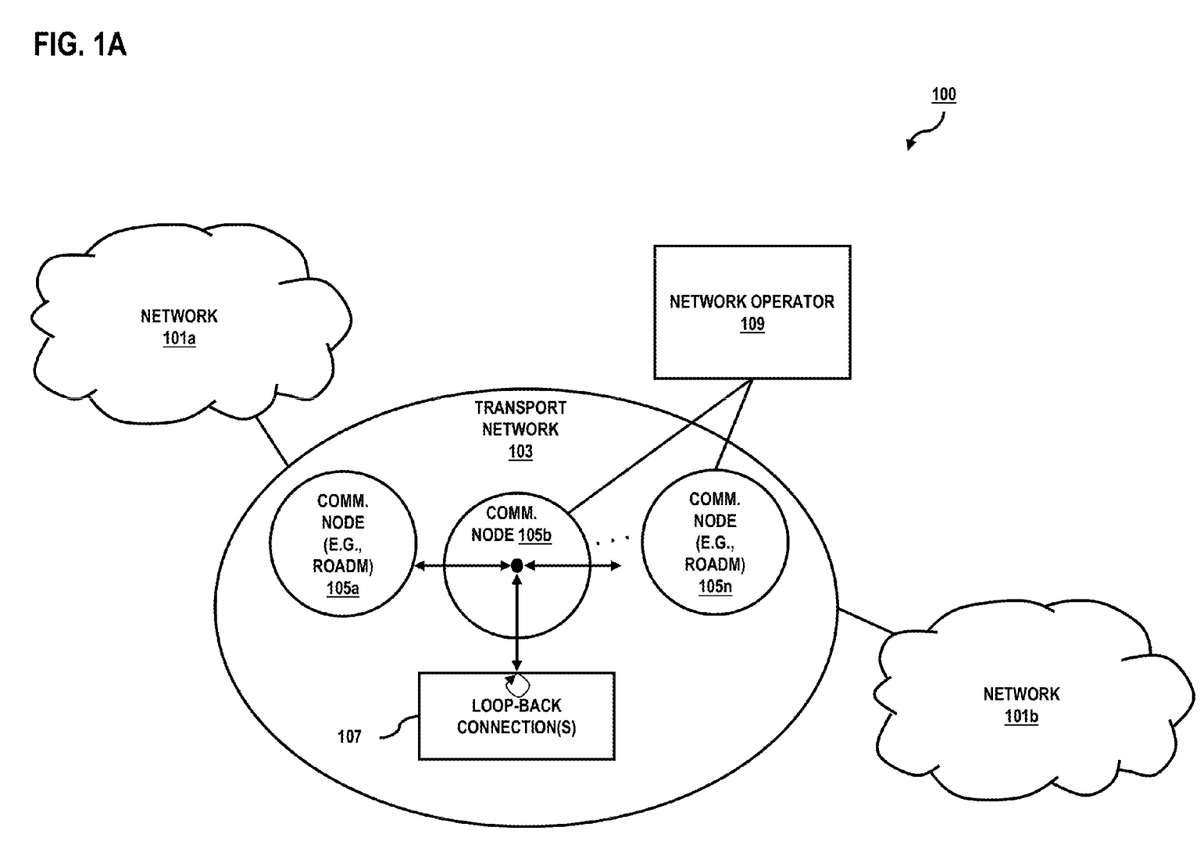
FIGS. 1A-1C are diagrams of an optical network configured to perform loop-back functions, according to various embodiments.

FIG. 1A is a diagram of a system configured to perform loop-back functions, according to one embodiment. For the purpose of illustration, the system 100 includes a network 101a, a network 101b, and a transport network 103, which includes one or more communication nodes (e.g., ROADM) 105a-105n, to carry traffic between network 101a and network 101b. The communication node 105, in certain embodiments, utilizes optical communication technology to carry data from one point to another. In this example, one or more loop-back connections 107 are utilized and are configured, for example, to enable a loop-back functionality, in part, by selectively switching signals to the one or more loop back connections 107. In one embodiment, a network operator 109 controls how the communication node 105 selectively switches signals and is configured to use the one or more loop-back connections 107 to check network performance. In this example, because the transport network 103 transports data between network 101a and 101b, the one or more loop-back connections 107 may troubleshoot connections to either network 101a and to network 101b. It is contemplated that communication node 105 may be configured to enable loop-back functionality at any add/drop point and/or any network direction.

Figure 1B:
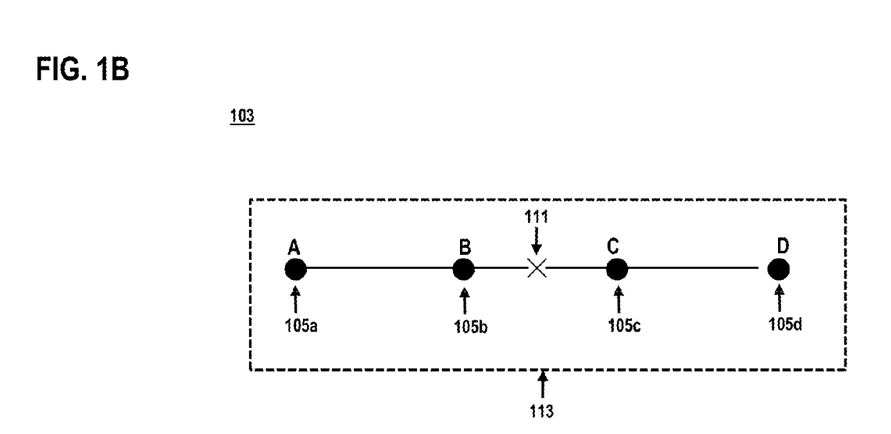

As mentioned, the use of ROADM to transfer data has further improved and developed data networks to deliver fast and reliable data transfers. As these networks grow in size, so too does the complexity in troubleshooting problems or failures in the network. Unfortunately, traditional means to troubleshoot (e.g., determine a location or cause, identify a responsible party, provide a resolution to the failure, etc.) an error are frequently time consuming in part because, for instance, a detected error may be due to a failure at any of the nodes between a sending and receiving node, or due to any of the connections between nodes. For example, the transport network 103 in FIG. 1B includes nodes 105a, 105b, 105c, and 105d, and a failure point 111; the failure point can result from a fault in the link and/or equipment. As such, network operator 109 may benefit from being able to further isolate a detected error 113 in sending signals from communication nodes 105a to 105d (and from communication nodes 105d to 105a) to, for instance, a connection between communication nodes 105b and 105c (e.g., failure point 111). Isolating a failure is particularly important when multiple parties are involved in the operation of the network. This capability permits the proper identification of the responsible party. In this manner, resources of a particular party may be further directed to troubleshooting network errors that are the responsibility of the particularly party.

Figure 1C:
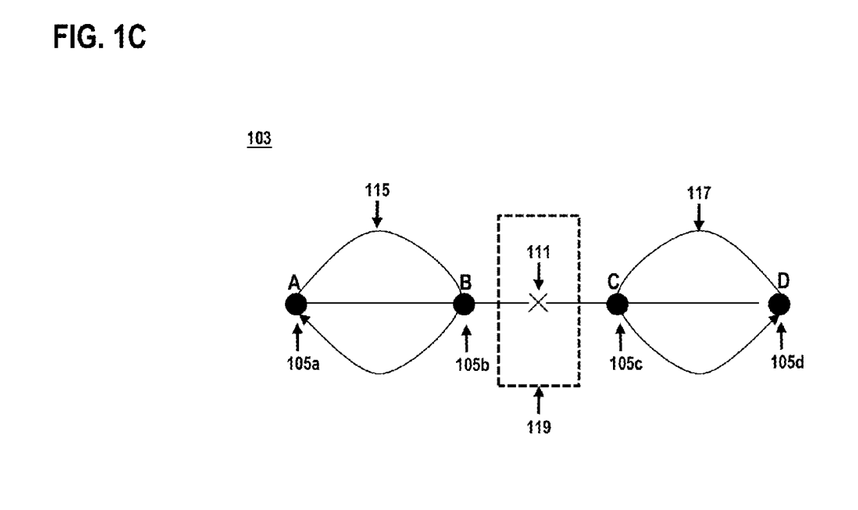

To address the issues with traditional approaches, system 100 of FIG. 1A introduces the capability to perform loop-back functionality within an optical network. By way of example, the network operator 109 can benefit from the transport network 103, whereby the time to perform troubleshooting time is reduced by utilizing the one or more loop back-connections 107. For instance, in FIG. 1C transport network 103 includes the communication nodes 105a, 105b, 105c, and 105d, and the failure point 111. Using loop-back functionality, troubleshooting time may be reduced by further isolating the failure point 111. For example, a failure point 111 detected between communication nodes 105a and 105d may be further isolated by causing communication node 105b to direct a loop-back signal 115 to communication node 105a, thereby determining the communication nodes 105a and 105b, and the path connecting the nodes to be failure free. Likewise, communication node 105c may direct a loop-back signal 117 to communication node 105d, thereby determining the communication nodes 105c and 105d and the path connecting the nodes to be failure free. In this manner, failure point 111 may be quickly isolated to a failure area 119 by determining nearby paths that are failure or error free (e.g., paths connecting communication nodes 105a and 105b, and paths connecting communication node 105c and 105d). Additionally, networks having multiple parties responsible for the operation of the network may further benefit from isolating failures (or problems) in the network to help to identify a party responsible to mitigate or repair the problem. For instance, isolating failure point 111 in the transport network 103 to the failure area 119 allows for a clear identification of a party responsible for mitigating or repairing failure point 111 (e.g., a party responsible for the connection between communication node 105b and 105c), rather than also requiring action from other parties that are not responsible (e.g., parties responsible for communication nodes 105a and 105d). That is, loop-back functionality enables network failures to be further isolated, allowing for a clear identification of a responsible party.

By way of example, each of the networks 101 may include any suitable wireline and/or wireless network. Network 101a may include, for example one or more of the following systems: a wireless network, a telephony network, a service provider network, and a data network. For example, network 101a may include a telephony network that includes a circuit-switched network, such as the public switched telephone network (PSTN), an integrated services digital network (ISDN), a private branch exchange (PBX), or other like network. Additionally, or alternatively, network 101a may include a wireless network employing various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. In yet another example, network 101 may include a data network such as, for example, any local area network (LAN), metropolitan area network (MAN), wide area network (WAN), the Internet, or any other suitable packet-switched network, such as a commercially owned, proprietary packet-switched network, such as a proprietary cable or fiber-optic network. It is noted that network 101b may also include anyone or more of the above networks. While specific reference will be made hereto, it is contemplated that system 100 may embody many forms and include multiple and/or alternative components and facilities.

Figure 2:
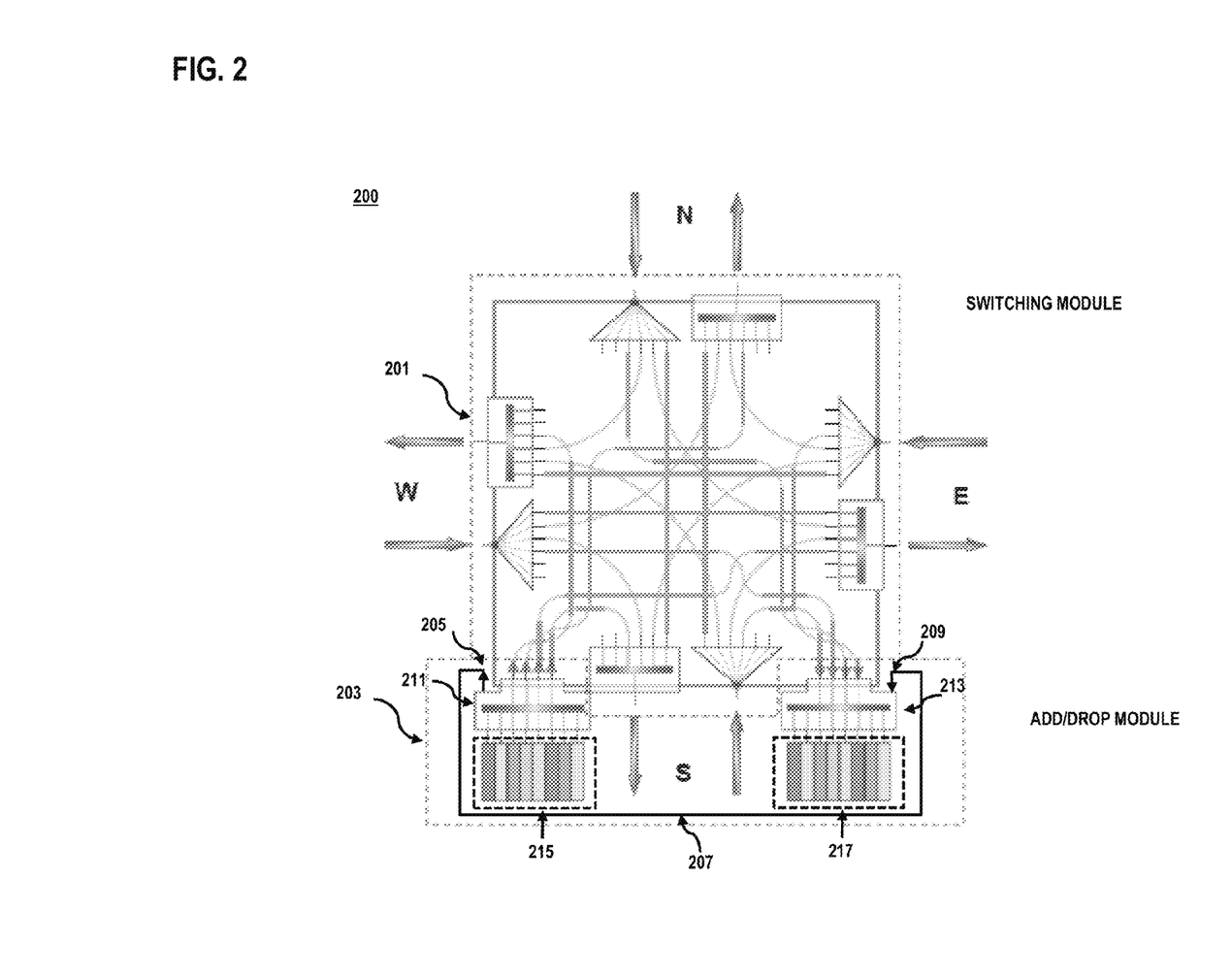
FIG. 2 is a diagram of a reconfigurable optical add/drop module (ROADM) configured to perform a loop-back function, according to one embodiment.

FIG. 2 is a diagram of a ROADM that can be deployed in the system of FIG. 1, according to one embodiment. A communication node 105 may comprise one or more components configured to execute the processes described herein (e.g., processes of FIG. 3) for providing the loop-back functionality of system 100. In one embodiment, communication node 105 is a ROADM 200 that includes a switching module 201, and an add/drop module 203. The switching module 201 is configured to switch signals to another optical communication node of a network, and the add/drop module 203 is configured to add and/or drop signals. The ROADM 200 contains a first port 205 designated as an ingress for a loop-back signal to be transported on a loop-back connection 207, and a second port 209 designated as an egress for the loop-back signal. In one embodiment, the selection of a loop-back signal into the first port 205 is performed on a per-wavelength basis by the wavelength selective switch 211, and the selection of signals from the second port 209 is performed on a per-wavelength basis by the wavelength selective switch 213. In this manner, the ROADM 200 includes loop-back functionality at any add ports 215, and any drop ports 217 to troubleshoot transport network 103. For instance, communication node 105b, using the ROADM 200, may send a loop-back signal transported from communication node 105a back to communication node 105a, thereby enabling a determination of whether the communication nodes 105a and 105b and the path or links connecting the nodes contain a failure point (e.g., 111).

While specific reference will be made to this particular embodiment, it is also contemplated that communication node 105 may embody many forms and include multiple and/or alternative components. For example, it is contemplated that the components of communication node 105 may be combined, located in separate structures, or separate locations. The ROADM 200 may be configured to enable loop-back functionality in any direction, for instance, north (N), south (S), west (W), and east (E). Additionally, the first port 205, loop-back connection 207, and the second port 209 may be located, for instance, on the switching module 201, add/drop module 203, or a combination thereof. It is contemplated a ROADM may contain one or more first ports 205, one or more second ports 209, and one or more loop-back connections 207. Additionally, or alternatively, a network may contain one or more ROADM with loop-back functionality, and one or more ROADM without loop-back functionality.

Figure 3:
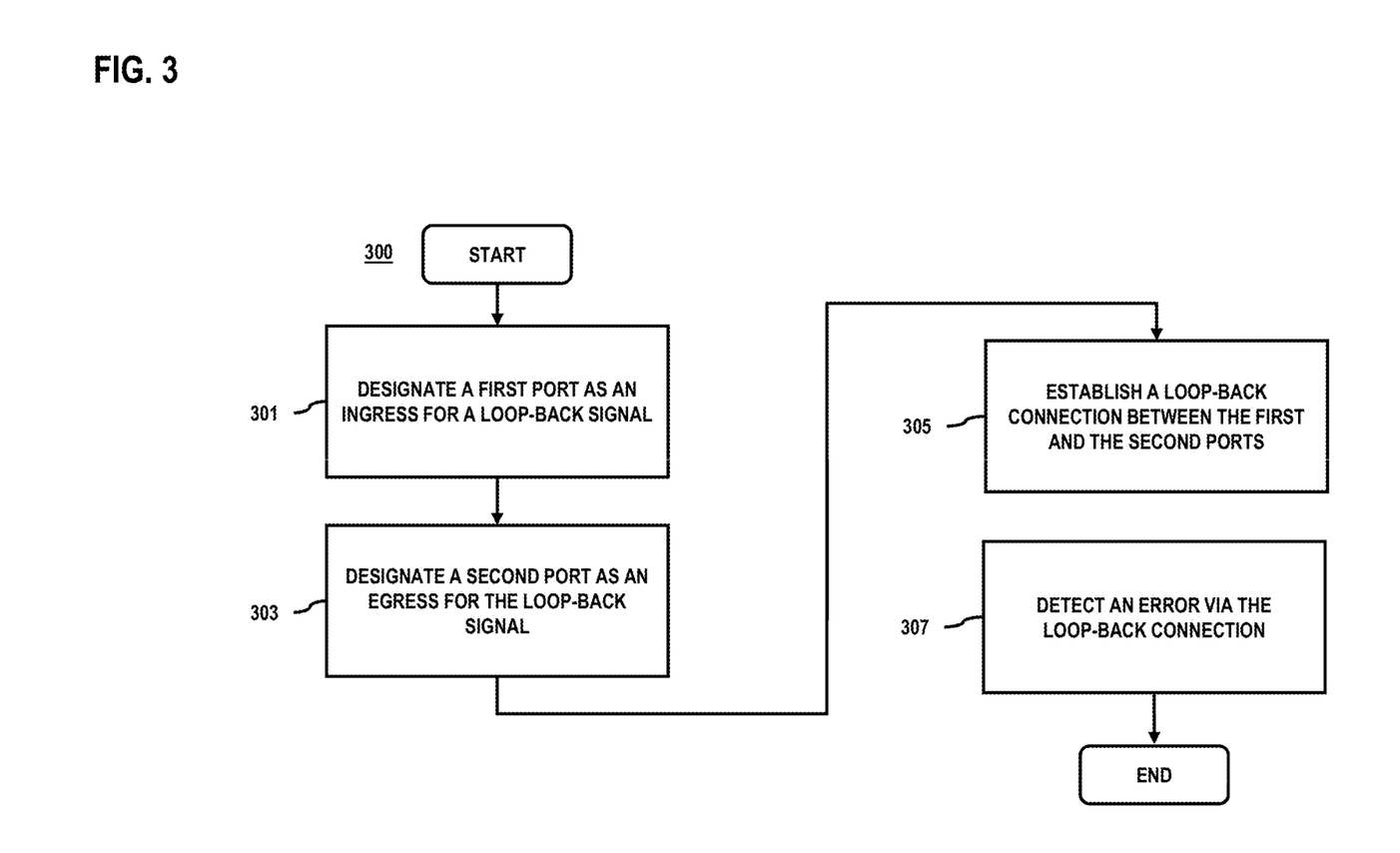
FIG. 3 is a flowchart of a process for troubleshooting an optical network with a loop-back function, according to one embodiment.

FIG. 3 is a flowchart of a process for troubleshooting an optical network with a loop-back function, according to one embodiment. For illustrative purpose, process 300 is described with respect to the systems of FIGS. 1 and 2. It is noted that the steps of process 300 may be performed in any suitable order, as well as combined or separated in any suitable manner. By way of example, such process 300 is performed by communication node 105. It is noted that various issues require troubleshooting, for example, loss of connectivity, high latency, processing delay, transmission delay, etc.

In step 301, the process 300 designates a first port as an ingress for a loop-back signal to troubleshoot a communication node (e.g., communication node 105). In one embodiment, one port on a switch (e.g., wavelength selective, photonic, multi-cast, etc.), splitter (e.g., optical splitter, coupler, wavelength splitter, combiner, etc.), is associated (e.g., added, assigned, designated, etc.) with a loop-back signal to be transported back to a source. For example, a communication node 105 of the transport network 103 may include a ROADM 200 with a first port 205 designated as an ingress for a loop-back signal. In one embodiment, the network operator 109 is able to control how to switch loop-back signals via the first port 205. In another embodiment, the transport network 103 and/or a communication node 105 controls how to switch loop-back signals via the first port 205.

In step 303, process 300 designates a second port as an egress for a loop-back signal to troubleshoot a communication node 105. In one embodiment, one port on a switch (e.g., wavelength selective, photonic, multi-cast, etc.), splitter (e.g., optical splitter, coupler, wavelength splitter, combiner, etc.), is associated with a loop-back signal to be transported back to a source. For instance, a communication node 105 of the transport network 103 may include a ROADM 200 with a second port 209 designated as an egress for a loop-back signal. In one embodiment, the first port 205 and the second port 209 are located on the same module (e.g., add/drop module 203, switching module 201). Additionally, the loop-back functionality may be performed towards customer equipment or network equipment. As used herein, loop-back functionality towards customer equipment refers to signals received (and carried) by the add/drop module (e.g., 203), and loop-back functionality towards network equipment refers to signals received (and transported) by the switching module (e.g., 201). For instance, a first port and a second port may be located on the add/drop module to loop-back signals towards network equipment (e.g., FIG. 4). In another example, a first port and a second port are located on a switching module to loop-back signals towards network equipment (e.g., FIG. 5). In yet another example, a first port and a second port are located on an add/drop module to loop-back signals towards customer equipment (e.g., FIG. 2, and FIGS. 6-8).

In step 305, process 300 establishes a loop-back connection between the first port and the second port to transport the loop-back optical signal. In one embodiment, the first port (e.g. 205) and the second port (e.g., 209) may be connected by a fiber optic cable, to transfer the loop-back optical signal from the first port to the second port. For example, the loop-back connection 207 transports a loop-back optical signal from the first port 205 to the second port 209.

Once the process 300 establishes the loop-back connection, an error associated with a portion of a communication path (e.g., formed within a communication network 103) is detected, as in step 307, based on the loop-back signal. That is, an error (e.g., failure, loss of connectivity, degradation of network performance, etc.) is further isolated by transferring a loop-back signal via the loop-back connection and monitoring the loop-back signal. In one embodiment, the network operator 109 switches a loop-back signal to a first port (e.g., port 205) located on a communication node 105, and selectively switches the loop-back signal from a second port (e.g., port 209) on the communication node 105 to determine whether or not a path traveled by the loop-back signal contains a portion of the communication path causing the error (e.g., failure point 111). For instance, the network operator 109 may switch a loop-back signal into a first port 205 located on communication node 105b (and/or communication node 105c) and transport the loop-back signal from the second port 209 to communication node 105a (and/or communication node 105d). In this manner, loop-back functionality enables network operators to check and isolate problems (e.g., errors, failure points, etc.) quickly and to clearly identify responsibility during network failure. In one embodiment, a loop-back signal generated at optical communication node 105a is received by another communication node 105b; accordingly, communication node 105a receives the loop-back signal via the loop-back connection of the receiving communication node 105b.

Figure 4:
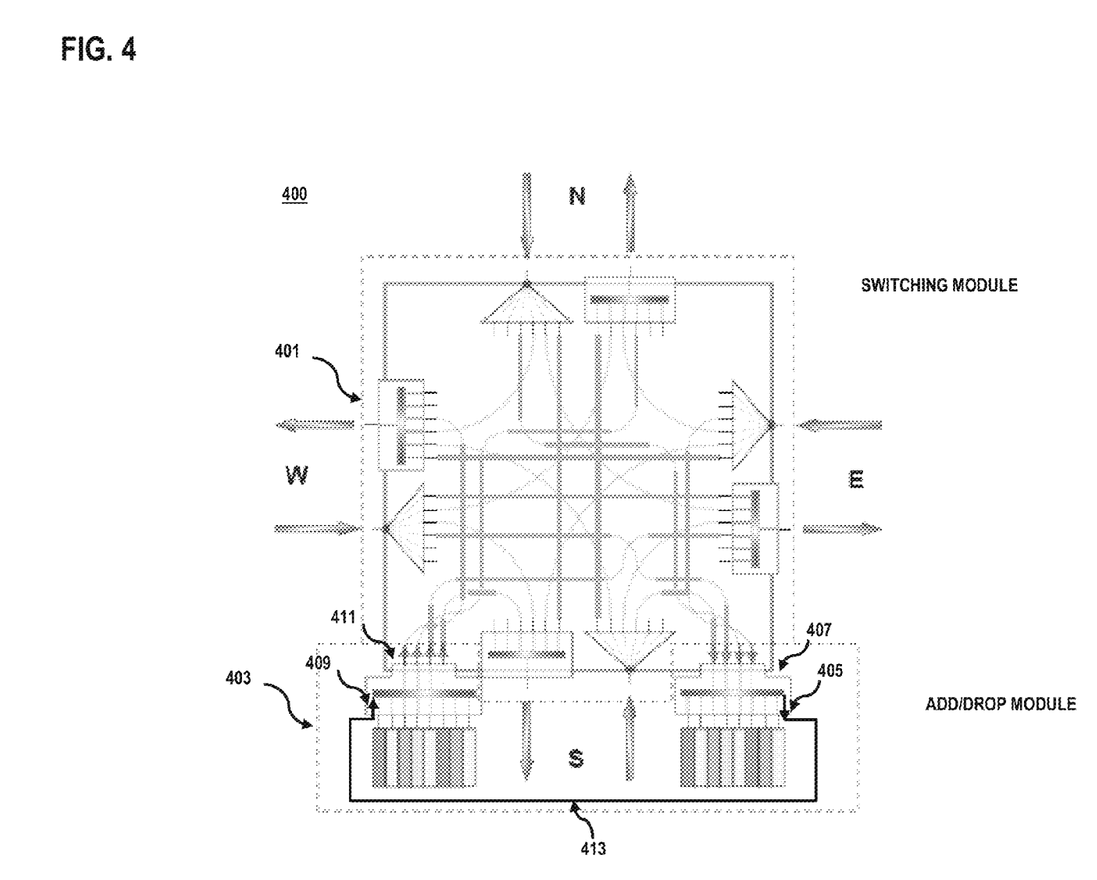
FIG. 4 is a diagram of a ROADM configured to check and isolate problems towards network equipment with loop-back ports located on the add/drop module, according to one embodiment.

FIG. 4 is a diagram of a ROADM configured to check and isolate problems towards network equipment with loop-back ports located on the add/drop module, according to one embodiment. In the exemplary embodiment, the ROADM 400 includes a switching module 401, and an add/drop module 403 with a first port 405 of a wavelength selective switch 407, a second port 409 of a wavelength selective switch 411, and a loop-back connection 413. In one embodiment, the selection of a loop-back signal into the first port 405 is performed on a per-wavelength basis by the wavelength selective switch 407, and the selection of the loop-back signal from the second port 409 is performed on a per-wavelength basis by the wavelength selective switch 411. In this manner, an error may be detected via the loop-back connection 413 by switching a loop-back signal from a direction (e.g., N, S, W, E) into the first port 405 using the wavelength selective switch 407, switching the loop-back signal from the second port 409 into a direction (e.g., N, S, W, E) using the wavelength selective switch 411, and determining whether or not a path traveled by the loop-back signal contains a portion of a communication path causing the error (e.g., failure point 111).

Figure 5:
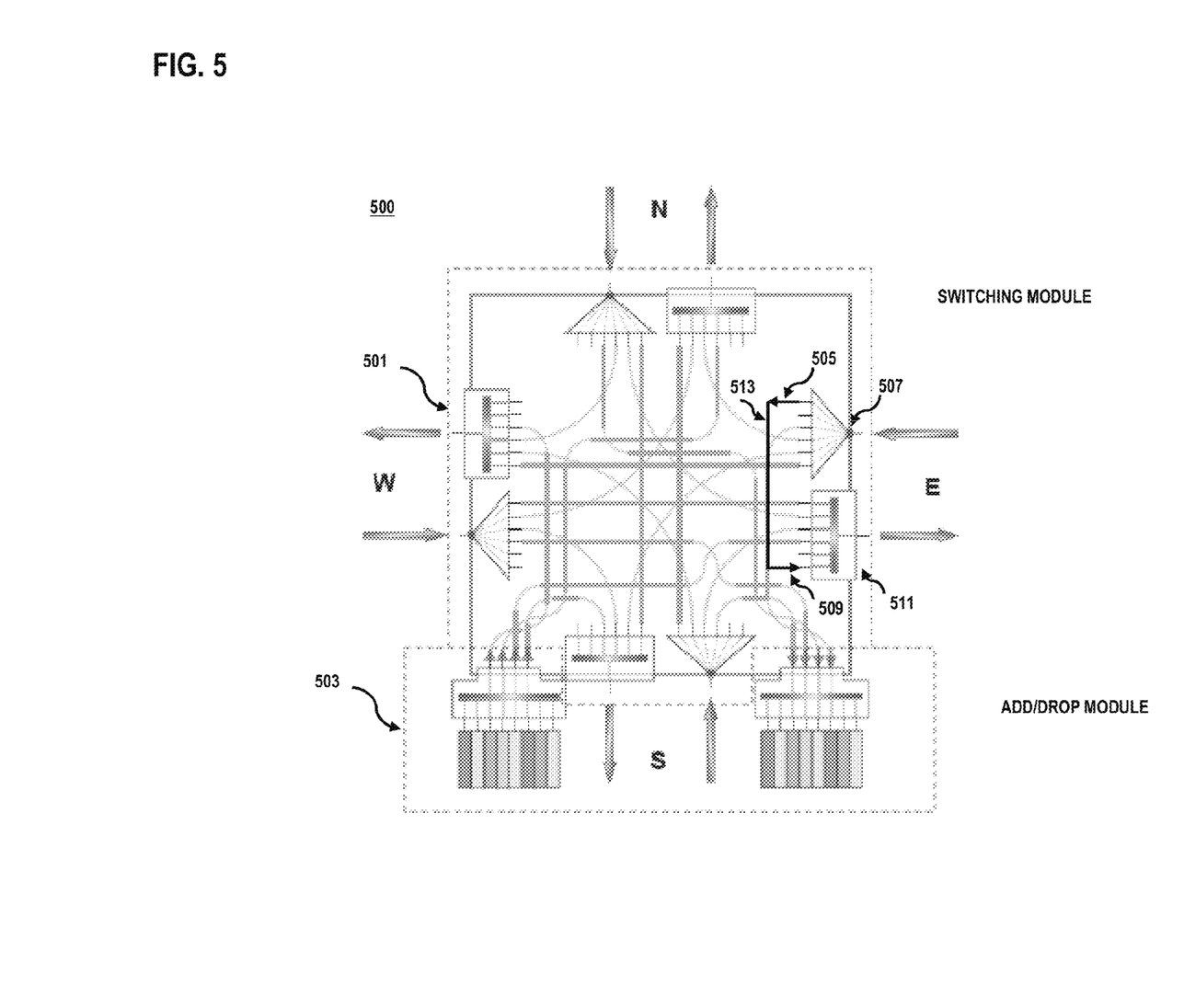
FIG. 5 is a diagram of a ROADM configured to check and isolate problems towards network equipment with loop-back ports located on the switching module, according to one embodiment.

FIG. 5 is a diagram of a ROADM configured to check and isolate problems towards network equipment with loop-back ports located on the switching module, according to one embodiment. In the exemplary embodiment, the ROADM 500 includes a switching module 501, and an add/drop module 503. In one embodiment, the switching module 501 includes a first port 505 of an optical splitter 507, a second port 509 of a wavelength selective switch 511, and a loop-back connection 513. In one embodiment, the selection of a loop-back signal into the first port 505 is performed on a per-wavelength basis by the optical splitter 507, and the selection of signals from the second port 509 is performed on a per-wavelength basis by the wavelength selective switch 511. That is, the loop-back signal is switched to the first port 505 by transmitting the loop-back signal on a wavelength associated with the designated first port 505. In this manner, an error may be detected via the loop-back connection 513 by switching a loop-back signal having a wavelength associated with the first port 505 into the first port 505 using the optical splitter 507, switching the loop-back signal from the second port 509 using the wavelength selective switch 511, and determining whether or not a path traveled by the loop-back signal contains a portion of a communication path causing the error (e.g., failure point 111). It is contemplated, that the loop back function illustrated in FIG. 5 may be applied to other network directions (e.g., N, W, and S).

Figure 6:
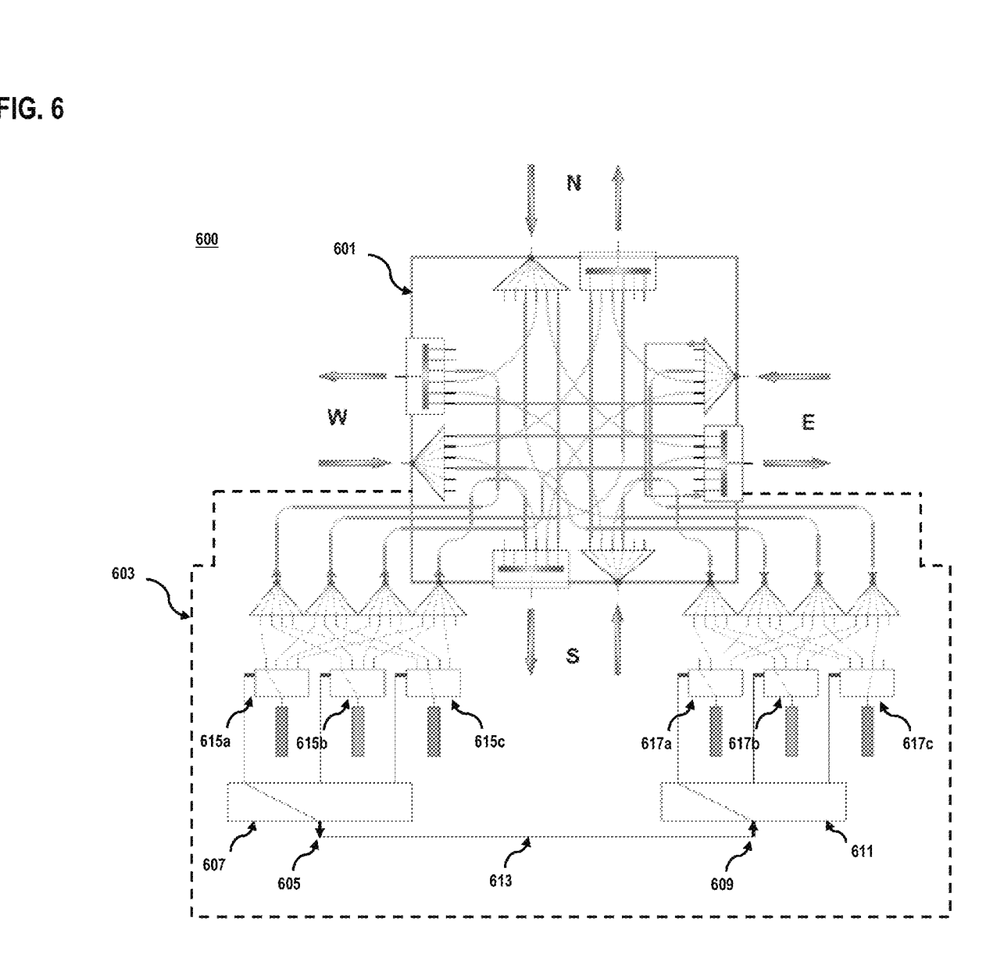
FIG. 6 is a diagram of a ROADM configured to check and isolate problems towards customer equipment with loop-back ports located on the add/drop module, according to one embodiment.

FIG. 6 is a diagram of a ROADM configured to check and isolate problems towards customer equipment with loop-back ports located on the add/drop module, according to one embodiment. In the exemplary embodiment, the ROADM 600 includes a switching module 601, and an add/drop module 603 with a first port 605 of a photonic switch 607, a second port 609 of a photonic switch 611, and a loop-back connection 613. In one embodiment, the selection of a loop-back signal into the first port 605 is performed by first switching the loop-back signal using photonic switch 615 (e.g., photonic switch 615a), and then switching the loop-back signal using photonic switch 607. Additionally, the selection of a loop-back signal from the second port 609 may be performed by first switching the loop-back signal using photonic switch 611, and then switching the loop-back signal using photonic switch 617 (e.g., photonic switch 617*a*). In this manner, an error may be detected via the loop-back connection 613 by switching a loop-back signal from an add port into the first port 605 using the photonic switch 607 and the photonic switch 615 (e.g., 615*a*), switching the loop-back signal from the second port 609 to a drop port using the photonic switch 611 and the photonic switch 617 (e.g., 615*a*), and determining whether or not a path traveled by the loop-back signal contains a portion of a communication path causing the error (e.g., failure point 111).

Figure 7:
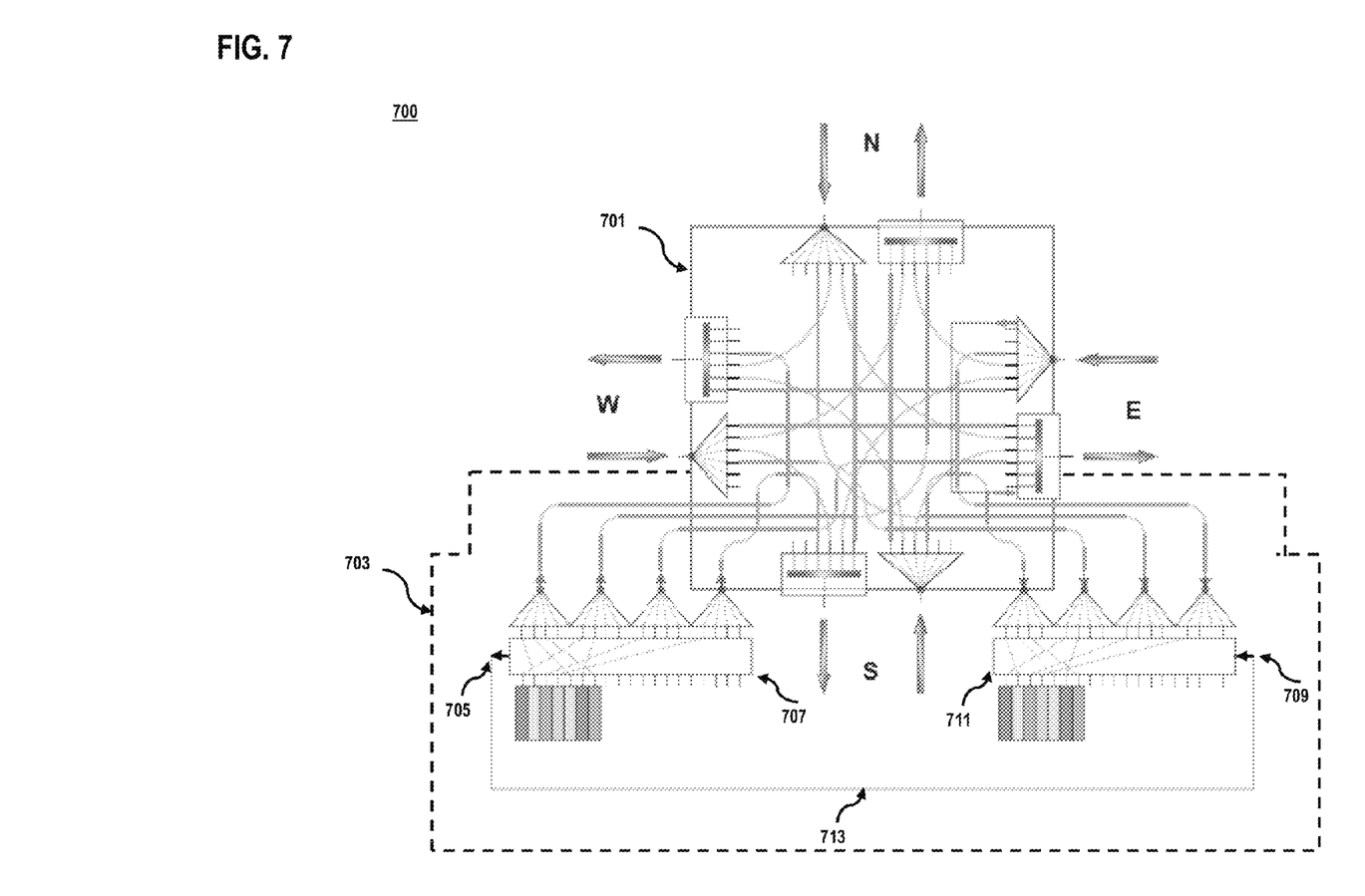
FIG. 7 is another diagram of a ROADM configured to check and isolate problems towards customer equipment with loop-back ports located on the add/drop module, according to one embodiment.

FIG. 7 is another diagram of a ROADM configured to check and isolate problems towards customer equipment with loop-back ports located on the add/drop module, according to one embodiment. In one embodiment, the ROADM 700 includes a switching module 701, and an add/drop module 703 with a first port 705 of a photonic switch 707, a second port 709 of a photonic switch 711, and a loop-back connection 713 (e.g., a fiber optic connection). In one embodiment, the selection of a loop-back signal into the first port 705 is performed by the photonic switch 707 and the selection of signals from the second port 709 is performed by the photonic switch 711. In this manner, an error may be detected via the loop-back connection 713 by switching a loop-back signal from an add port into the first port 705 using the photonic switch 707, switching the loop-back signal from the second port 709 to a drop port using the photonic switch 711, and determining whether or not a path traveled by the loop-back signal contains a portion of a communication path causing the error (e.g., failure point 111).

Figure 8:
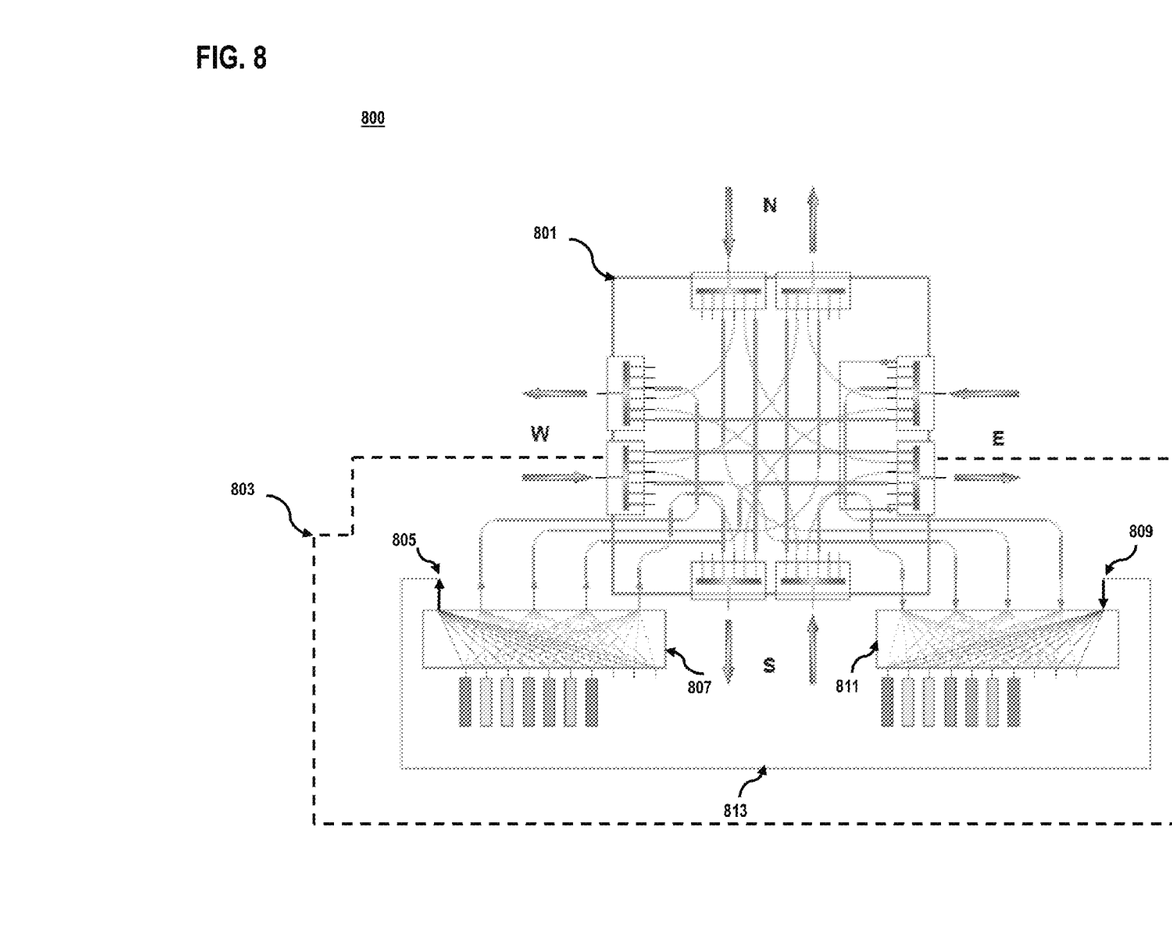
FIG. 8 is yet another diagram of a ROADM configured to check and isolate problems towards customer equipment with loop-back ports located on the add/drop module, according to one embodiment.

FIG. 8 is yet another diagram of a ROADM configured to check and isolate problems towards customer equipment with loop-back ports located on the add/drop module, according to one embodiment. In the exemplary embodiment, the ROADM 800 contains a switching module 801, and an add/drop module 803 with a first port 805 of a multi-cast switch 807, a second port 809 of a multi-cast switch 811, and a loop-back connection 813. In one embodiment, the selection of a loop-back signal into the first port 805 is performed by the multi-cast switch 807 and the selection of signals from the second port 809 is performed by the multi-cast switch 811. In this manner, an error may be detected via the loop-back connection 813 by switching a loop-back signal from an add port into the first port 805 using the multi-cast switch 807, switching the loop-back signal from the second port 809 into a drop port using the multi-cast switch 811, and determining whether or not a path traveled by the loop-back signal contains a portion of a communication path causing the error (e.g., failure point 111).

The processes for troubleshooting ROADM networks described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
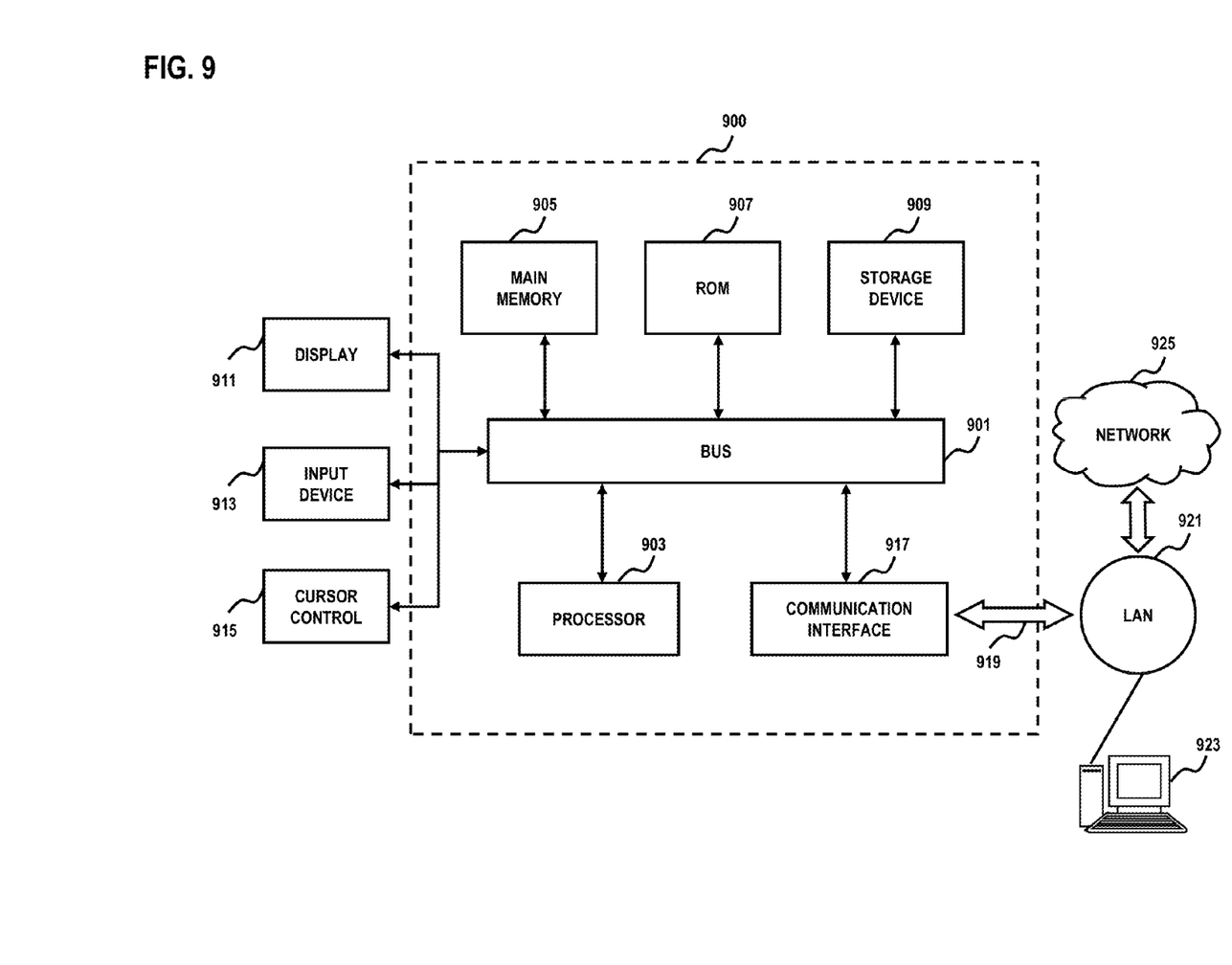
FIG. 9 is a diagram of a computer system that can be used to implement various exemplary embodiments.

FIG. 9 illustrates computing hardware (e.g., computer system) 900 upon which exemplary embodiments can be implemented. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a touch screen or a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to one embodiment, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement exemplary embodiments. Thus, exemplary embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g., for Ethernet™ or an Asynchronous Transfer Model (ATM) network) to provide a data communication connection to a compatible LAN. Wireless links can also be implemented. In any such embodiment, communication interface 917 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices.

For example, the network link 919 may provide a connection through local network 921 to a host computer 923, which has connectivity to a network 925 (e.g., a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing one embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
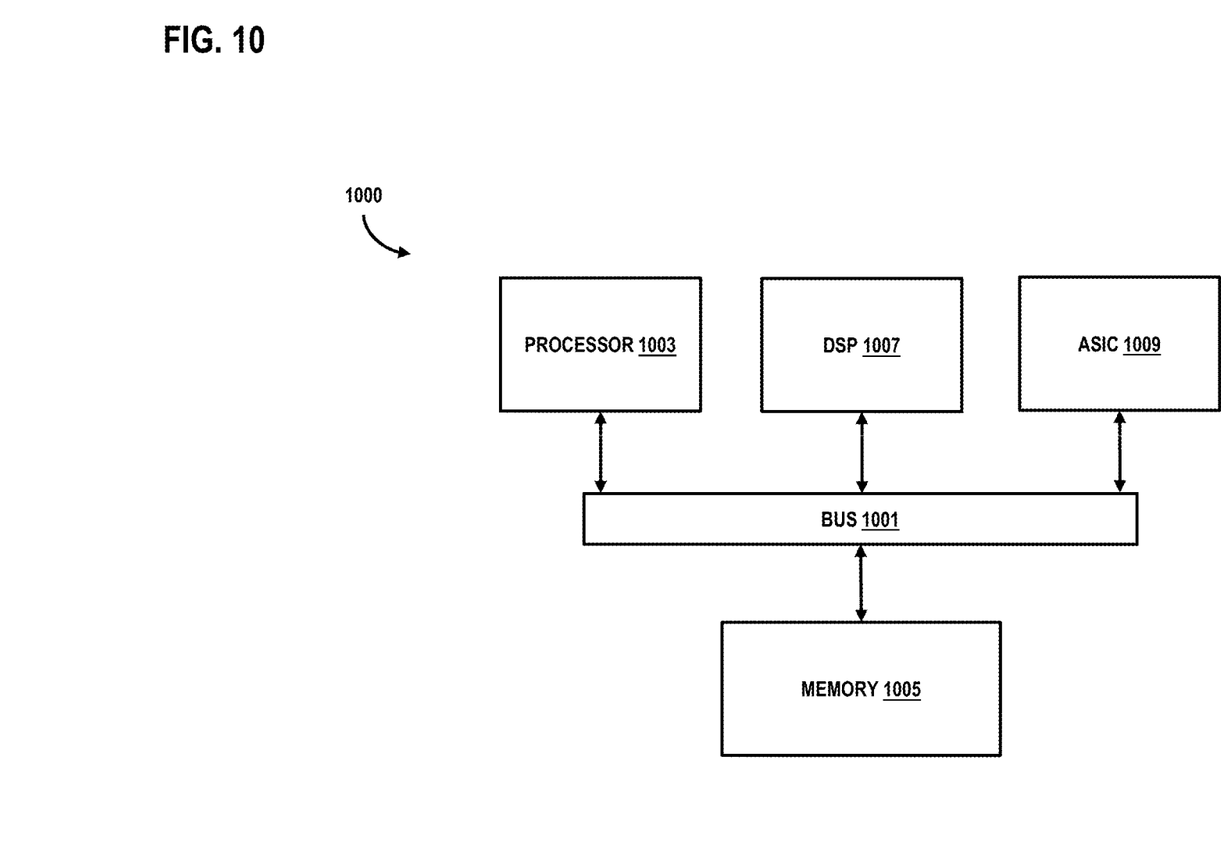
FIG. 10 is a diagram of a chip set that can be used to implement various exemplary embodiments.

FIG. 10 illustrates a chip set or chip 1000 upon which an embodiment of the invention may be implemented. Chip set 1000 is programmed to enable the loop-back functionality of communication node 105 as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of enabling the loop-back functionality of communication node 105.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to enable virtual throwing of objects. The memory 1005 also stores the data associated with or generated by the execution of the inventive steps.

While certain exemplary embodiments and implementations have been described herein, other embodiments and modifications will be apparent from this description. Accordingly, the invention is not limited to such embodi-

What is claimed is:

1. A method comprising:
designating a first port, of an optical communication node of a transport network, as an ingress for a loop-back optical signal to troubleshoot the transport network during operations of the transport network, wherein the optical communication node is configured to be operated by a network operator and the transport network serves a plurality of networks associated with a plurality of customers;
designating a second port, of the optical communication node, as an egress for the loop-back optical signal;
establishing a loop-back connection between the first port and the second port to transport the loop-back optical signal;
monitoring the loop-back connection to detect one or more errors within the transport network or one or more of the networks corresponding to the customers based on, at least in part, receipt of the loop-back optical signal by the communication node;
transferring the loop-back optical signal, based on a detection of the one or more errors, by selectively switching the loop-back signal from the second port to establish a transfer path traveled by the transferred loop-back optical signal;
monitoring the transferred loop-back optical signal to determine whether the established transfer path includes, at least in part, the one or more detected errors;
isolating the one or more detected errors based on a determination based on monitoring the transferred loop-back optical signal on the established transfer path; and
identifying a responsible party associated with the one or more isolated errors, wherein the responsible party includes either the network operator or one of the plurality of customers.

2. The method of claim 1, wherein the optical communication node includes a reconfigurable optical add/drop module (ROADM).

3. The method of claim 1, wherein the transport network includes a plurality of optical communication nodes including the optical communication node, the method further comprising:
detecting the one or more errors based on the loop-back signal, wherein the one or more errors are associated with a portion of a communication path formed by the optical communication nodes within the transport network.

4. The method of claim 1, further comprising:
generating the loop-back optical signal at another optical communication node of the transport network, wherein the other optical communication node is configured to receive the loop-back optical signal via the loop-back connection of the optical communication node.

5. The method of claim 1, wherein the optical communication node includes an add/drop module configured to add and/or drop signals and a switching module configured to switch signals to another optical communication node of the transport network.

6. The method of claim 5, further comprising:
switching, by the add/drop module, the loop-back signal into the first port, wherein the first port is of the add/drop module.

7. The method of claim 6, wherein the switching is by a per-wavelength basis.

8. The method of claim 6, wherein switching is by a multicast switch.

9. The method of claim 5, further comprising:
switching, by the switching module, the loop-back signal to the add/drop module;
switching, by the add/drop module, the loop-back signal into the first port, wherein the first port and the second port are of the add/drop module; and
switching, by the add/drop module, the loop-back signal from the second port, into the switching module.

10. The method of claim 5, further comprising:
switching, by the switching module, the loop-back signal into the first port, wherein the first port and the second port are of the switching module; and
switching, by the switching module, the loop-back signal from the second port.

11. An apparatus comprising:
at least one processor; and
at least one memory including computer program code for one or more programs,
the at least one memory and the computer program code configured to, with the at least one processor, cause the apparatus to perform at least the following:
designate a first port, of an optical communication node of a transport network, as an ingress for a loop-back optical signal to troubleshoot the transport network during operations of the transport network, wherein the optical communication node is configured to be operated by a network operator and the transport network serves a plurality of networks associated with a plurality of customers,
designate a second port, of the optical communication node, as an egress for the loop-back optical signal,
establish a loop-back connection between the first port and the second port to transport the loop-back optical signal,
monitor the loop-back connection to detect one or more errors within the transport network or one or more of the networks corresponding to the customers based on, at least in part, receipt of the loop-back optical signal by the communication node,
transfer the loop-back optical signal, based on a detection of the one or more errors, by selectively switching the loop-back signal from the second port to establish a transfer path traveled by the transferred loop-back optical signal;
monitor the transferred loop-back optical signal to determine whether the established transfer path includes, at least in part, the one or more detected errors;
isolate the one or more detected errors based on a determination based on monitoring the transferred loop-back optical signal on the established transfer path; and
identify a responsible party associated with the one or more isolated errors, wherein the responsible party includes either the network operator or one of the plurality of customers.

12. The apparatus of claim 11, wherein the optical communication node includes a reconfigurable optical add/drop module (ROADM).

13. The apparatus of claim 11, wherein the transport network includes a plurality of optical communication nodes including the optical communication node, the apparatus is further caused to:

detect the one or more errors based on the loop-back signal, wherein the one or more errors are associated with a portion of a communication path formed by the optical communication nodes within the transport network.

14. The apparatus of claim 11, wherein the apparatus is further caused to:
generate the loop-back optical signal at another optical communication node of the transport network, wherein the other optical communication node is configured to receive the loop-back optical signal via the loop-back connection of the optical communication node.

15. The apparatus of claim 11, wherein the optical communication node includes an add/drop module configured to add and/or drop signals and a switching module configured to switch signals to another optical communication node of the transport network.

16. The apparatus of claim 15, wherein the apparatus is further caused to:
switch, by the add/drop module, the loop-back signal into the first port, wherein the first port is of the add/drop module.

17. The apparatus of claim 16, wherein the switching is by a per-wavelength basis.

18. The apparatus of claim 16, wherein switching is by a multicast switch.

19. The apparatus of claim 15, wherein the apparatus is further caused to:
switch, by the switching module, the loop-back signal to the add/drop module,
switch, by the add/drop module, the loop-back signal into the first port, wherein the first port and the second port are of the add/drop module, and
switch, by the add/drop module, the loop-back signal from the second port, into the switching module.

20. The apparatus of claim 15, wherein the apparatus is further caused to:
switch, by the switching module, the loop-back signal into the first port, wherein the first port and the second port are of the switching module, and
switch, by the switching module, the loop-back signal from the second port.

* * * * *